United States Patent
Hiyokawa

(10) Patent No.: US 8,180,570 B2
(45) Date of Patent: May 15, 2012

(54) NAVIGATION APPARATUSES, METHODS, AND PROGRAMS

(75) Inventor: Toyoji Hiyokawa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 947 days.

(21) Appl. No.: 12/216,773

(22) Filed: Jul. 10, 2008

(65) Prior Publication Data

US 2009/0030598 A1    Jan. 29, 2009

(30) Foreign Application Priority Data

Jul. 24, 2007 (JP) ................................. 2007-192167

(51) Int. Cl.
*G01C 21/00* (2006.01)
(52) U.S. Cl. ........................................ 701/527; 701/533
(58) Field of Classification Search .................. 701/202, 701/209, 201; *G01C 21/00*
See application file for complete search history.

(56) References Cited

U.S. PATENT DOCUMENTS

| | | | | |
|---|---|---|---|---|
| 5,617,319 | A * | 4/1997 | Arakawa et al. | 701/207 |
| 5,638,279 | A * | 6/1997 | Kishi et al. | 701/200 |
| 6,636,806 | B1 * | 10/2003 | Irie | 701/211 |
| 7,177,761 | B2 * | 2/2007 | Kaufman et al. | 701/211 |
| 7,844,393 | B2 * | 11/2010 | Takizawa | 701/201 |
| 2005/0273251 | A1 * | 12/2005 | Nix et al. | 701/201 |
| 2006/0058943 | A1 * | 3/2006 | Pascual et al. | 701/200 |
| 2006/0265422 | A1 * | 11/2006 | Ando et al. | 707/104.1 |
| 2007/0150174 | A1 * | 6/2007 | Seymour et al. | 701/200 |
| 2008/0046844 | A1 * | 2/2008 | Sugie et al. | 715/856 |
| 2009/0043496 | A1 * | 2/2009 | Koga et al. | 701/209 |
| 2009/0157291 | A1 * | 6/2009 | Kudo et al. | 701/200 |
| 2010/0063721 | A1 * | 3/2010 | Won | 701/201 |

FOREIGN PATENT DOCUMENTS

JP    A-2005-321410    11/2005

OTHER PUBLICATIONS

Simmons, R., Browning, B., Yilu Zhang, Sadekar, V., "Learning to Predict Driver Route and Destination Intent", Digital Object Identifier: 10.1109/ITSC.2006.1706730, Publication Year: 2006, pp. 127-132.*
Terada, T., Miyamae, M., Kishino, Y., Tanaka, K., Nishio, S., Nakagawa, T., Yamaguchi, Y., "Design of a Car Navigation System that Predicts User Destination", Digital Object Identifier: 10.1109/MDM.2006.67, Publication Year: 2006, p. 145.*

* cited by examiner

*Primary Examiner* — Tuan C. To
(74) *Attorney, Agent, or Firm* — Oliff & Berridge, PLC

(57) ABSTRACT

Navigation apparatuses, methods, and programs having conducted a search for an original driving route that goes through a plurality of destinations in a designated order and provided route guidance based on the original driving route, receive an input of a new destination. Upon receipt of the new destination, the apparatuses, methods, and programs designate an ordinal position of the new destination in terms of the designated order and receive an input of a destination change request. When the destination change request is received, the apparatuses, methods, and programs automatically delete one or more of the destinations in ordinal positions within the designated order that are before the ordinal position of the new destination, conduct a new search for a new driving route based on the new destination, and output the new driving route. When an added destination request is received, the apparatuses, methods, and programs conduct a search for the new driving route including the new destination, without deleting destinations in ordinal positions within the designated order that are before the ordinal position of the new destination.

20 Claims, 6 Drawing Sheets

NAVIGATION APPARATUSES, METHODS, AND PROGRAMS

INCORPORATION BY REFERENCE

The disclosure of Japanese Patent Application No. 2007-192167, filed on Jul. 24, 2007, including the specification, drawings, and abstract is incorporated herein by reference in its entirety.

BACKGROUND

1. Related Technical Fields

Related technical fields include navigation apparatuses, methods, and programs.

2. Related Art

Navigation apparatuses that search for a route to a destination and provide the driver of a vehicle with the searched route are widely used. These navigation apparatuses conduct a search for a driving route to the destination that has been specified by the user and provide guidance along the route. Japanese Patent Application Publication No. JP-A-2005-321410 proposes a technique that allows the user of such a device to set not only a destination to be reached finally (hereinafter, a "final destination") but also one or more route waypoints, i.e., destinations that the user wishes to go through before reaching the final destination, so that a search is conducted for a driving route that goes through the one or more waypoints that have been specified.

FIGS. 6A, 6B, 6C, and 6D show an overview of a procedure for adding a destination by using a navigation apparatus according to related art. For example, when the user wishes to change a route (FIG. 6A) that goes through destinations A and B and then destinations C, D, and so on, to a route (FIG. 6D) that goes through a destination B' and then the destinations C, D, and so on, (that is, the user wishes to replace the destinations A and B with the destination B'), the user performs the procedure as described below.

First, the user causes a destination addition setting screen to be displayed and adds the destination B' between the destination B and the destination C, as shown in FIG. 6B. As a result, the navigation apparatus conducts a route search for the sections a and b that are before and after the added destination B'.

Next, the user causes a destination deletion setting screen to be displayed and deletes the destination A and the destination B, as shown in FIG. 6C. As a result, the navigation apparatus conducts a route search for the section c from the starting location to the added destination B'.

Accordingly, as shown in FIG. 6D, the destinations on the route in the setting have been changed so as to indicate the destinations B', C, and D in the stated order.

SUMMARY

As explained above, according to the related art, the destination adding process and the destination deleting process are performed as two separate processes. Thus, when the user wishes to change the destinations to the destination B' while the vehicle is driven to the destination A, the user needs to manually input instructions and to request that the destination B' should be added and that the destinations A and B should be deleted. Such operations to input the instructions and make the requests are troublesome for the user.

Exemplary implementations of the broad principles described herein reduce the burden on the user when he/she needs to change the setting of the destinations.

According to exemplary implementations, when a destination change request has been input, one or more destinations before the added new destination are deleted, without the user having to instruct that those destinations should be deleted. Thus, it is possible to reduce the burden of the user when he/she needs to change the setting of the destinations.

Exemplary implementations provide apparatuses, methods, and programs that, having conducted a search for an original driving route that goes through a plurality of destinations in a designated order and provided route guidance based on the original driving route, receive an input of a new destination. Upon receipt of the new destination, the apparatuses, methods, and programs designate an ordinal position of the new destination in terms of the designated order and receive an input of a destination change request. When the destination change request is received, the apparatuses, methods, and programs automatically delete one or more of the destinations in ordinal positions within the designated order that are before the ordinal position of the new destination, conduct a new search for a new driving route based on the new destination, and output the new driving route. When an added destination request is received, the apparatuses, methods, and programs conduct a search for the new driving route including the new destination, without deleting destinations in ordinal positions within the designated order that are before the ordinal position of the new destination.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

An example will be explained below in which a navigation apparatus having a function to conduct a search for a driving route that goes through a plurality of destinations in a designated order receives a destination change request or a destination addition request and renews a destination condition setting according to the received request.

According to the present example, on a new destination setting screen, the user designates a destination that is newly set. On a new destination ordinal position designating screen, the user designates an ordinal position (e.g., the first position, the second position etc.) of the new destination in terms of a route order (i.e., the order in which the vehicle is to be routed through the destinations).

On the new destination setting screen and the new destination ordinal position designating screen, request designating keys used for designating request items such as the destination change request and the destination addition request are provided. The user is able to input his/her desired request by operating the request designating keys.

When the user has input a destination change request, the navigation apparatus deletes the setting of the destinations arranged so as to be in ordinal positions that are before the designated ordinal position of the new destination in terms of the route order, so that a change is made to the setting, and the new destination is arranged so as to be, eventually, in the first position in terms of the route order. The navigation apparatus then conducts a search again for a driving route, based on the contents of the setting of the destinations obtained after the change.

When the user has input a destination addition request, the navigation apparatus adds the new destination to the setting of the destinations that are currently specified so that the vehicle is to be routed through the new destination in a designated ordinal position in terms of the route order. The navigation apparatus then conducts a search again for a driving route, based on the contents of the setting of the destination obtained after the addition of the new destination.

Figure 1:
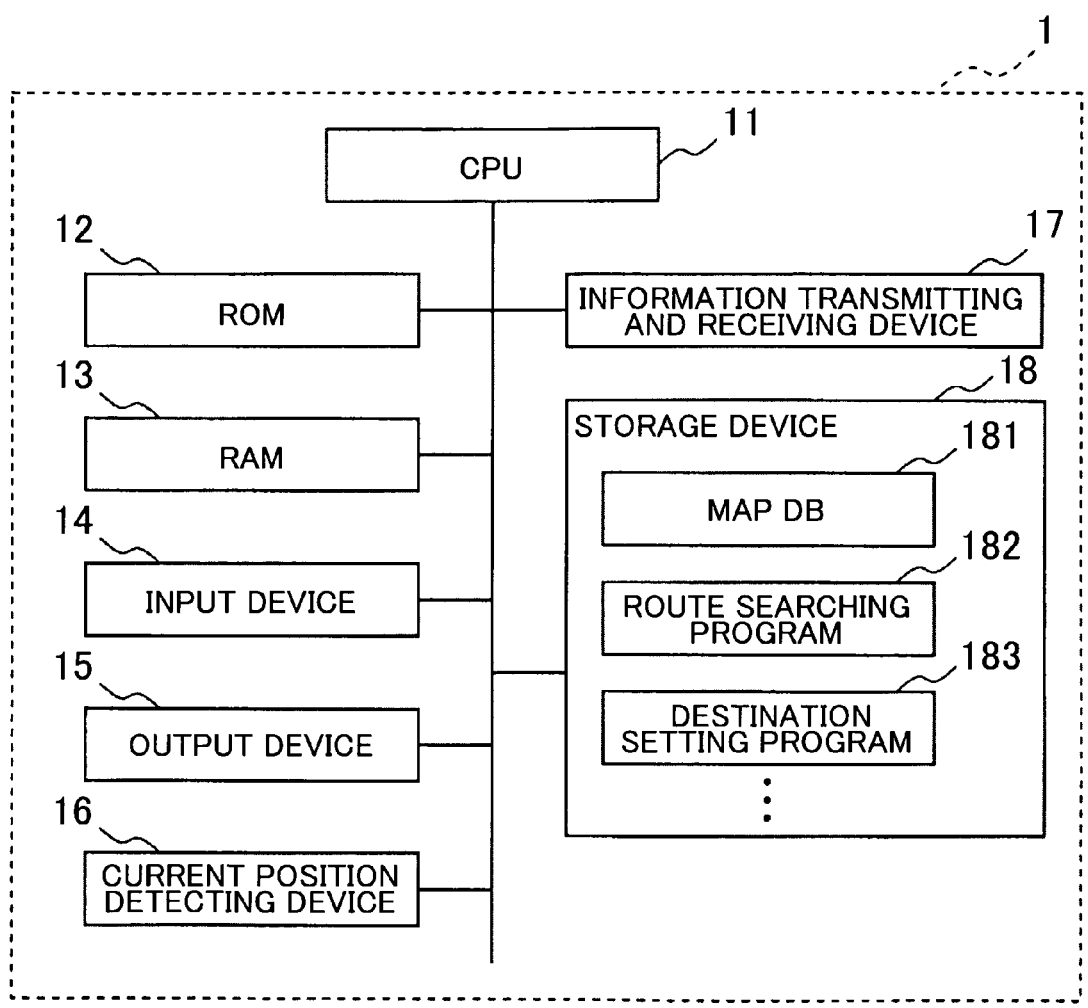
FIG. 1 is a drawing that shows a schematic configuration of an exemplary navigation apparatus.

As shown in FIG. 1, the navigation apparatus 1 physically, functionally, and/or conceptually includes a controller (e.g., CPU 11), a ROM 12, a RAM 13, an input device 14, an output device 15, a current position detecting device 16, an information transmitting and receiving device 17, and a storage device 18.

The CPU 11 is a central processing unit that controls the navigation apparatus 1 according to various types of programs and data that are stored in the ROM 12, the RAM 13, and the storage device 18. The ROM 12 is a read-only memory that stores therein basic programs and parameters that cause the navigation apparatus 1 to function. The RAM 13 is a storage area that serves as a working area of the CPU 11. The RAM 13 temporarily stores therein the data that is currently processed, for example, position information of a new destination that is newly set.

The input device 14 is a device that instructs the CPU 11 to perform a navigation process according to an intention of the user. For example, the input device 14 is a device used for inputting destinations (the positions on a map, the addresses, the coordinate information, etc.), destination ordinal positions (i.e., the order in which the vehicle is routed through the destinations), destination searching conditions, destination change requests, destination addition requests, new setting requests, and so on.

According to the present example, the input device 14 is configured with a touch panel (i.e., a touch screen) on which the user is able to point to the items by touching the display screen (i.e., the display) directly with a finger. However, it is acceptable to have another arrangement in which the input device 14 is configured with, for example, a remote controller having a jog dial or the like.

The output device 15 is a device that outputs results of the processing performed by the CPU 11 such as, for example, input information from the input device 14, route guidance information, a destination setting screen (i.e., a screen on which the ordinal positions of the destinations in terms of the route order is displayed), a map screen for the surroundings of the current position, various types of menu screens, and the like.

According to the present example, the output device 15 is configured with the touch panel that also serves as the input device 14. It is acceptable to have another arrangement in which a speaker that outputs route guidance by using audio and/or a printer that outputs the processed data in a printed form are additionally provided as the output device 15.

The current position detecting device 16 is used for detecting the current position (e.g., absolute coordinate values corresponding to the latitude and the longitude) of the vehicle in which the navigation apparatus 1 is installed. The current position detecting device 16 includes a GPS (Global Positioning System) receiver that obtains information from a GPS that measures the position of the vehicle by using an artificial satellite.

It is acceptable to have an arrangement in which the current position detecting device 16 also includes a geomagnetic sensor that detects geomagnetism and calculates the direction of the vehicle, a gyro sensor, a vehicle speed sensor, or the like, as a device that supplements the current position detection process performed by the GPS receiver.

The information transmitting and receiving device 17 is configured with a GPS receiver that obtains the current position, the date, time information, and the like by using a GPS and/or a VICS® (Vehicle Information and Communication System) information receiver that obtains traffic information and the like by using FM multiplex broadcasting, a radio beacon, an optical beacon, or the like and/or a data transmitting and receiving device that bi-directionally transmits and receives information to and from information centers (e.g., the ATIS (Advanced Traffic Information Service)) and other vehicles by using a mobile phone, a personal computer, or the like.

The storage device 18 is an external storage device that stores therein programs and data used for navigation. The storage device 18 stores therein data related to a map DB (database) 181, a route searching program 182, a destination setting program 183, as well as data used in the processing of the programs.

The map DB 181 is a database that stores therein information related to various types of maps such as map information and road information as well as facility information related to facilities (e.g., POI (Point of Interest) information), and the like.

The map information and the road information are used, not only when a search is conducted for a route to a destination, but also when various types of maps and roads in the surroundings of the current position of the vehicle and in the surroundings of a destination are displayed, as well as when the road on which the vehicle is currently being driven and a position on the road in which the vehicle is currently located are detected through a map matching process performed on the current position of the vehicle that has been detected by the current position detecting device 16 and the road information.

The route searching program 182 is a program used for conducting a search for a driving route based on the information of the destinations that have been set. The destination setting program 183 is a program used for setting new destinations on a route for which a search is to be conducted and for making a change in the destinations in a setting.

The storage device 18 includes, in addition to a ROM and/or a RAM, a magnetic recording medium such as a flexible disk, a hard disk, or a magnetic tape and/or a semiconductor recording medium such as a memory chip or an IC card and/or a recording medium from which information is optically read such as a CD-ROM, a DVD-ROM, an MO, a PD (i.e., a phase change rewritable disk) and/or any other recording medium that records thereon data and computer programs by using various types of methods. Further, it is acceptable to use different types of recording media for different content types.

Next, an exemplary destination changing method will be explained with reference to FIGS. 2-3C. In the sections below, the method will be described for a driving route that goes through a plurality of destinations in a designated order is set. Specifically, by using an example in which a driving route that goes through "XX International Airport," "XX Department Store," "XX City Hall," and "XX Country Club" in the stated order is changed so that the vehicle is headed for "YY Station" while the vehicle is being driven toward the first destination "XX International Airport."

Figure 2:
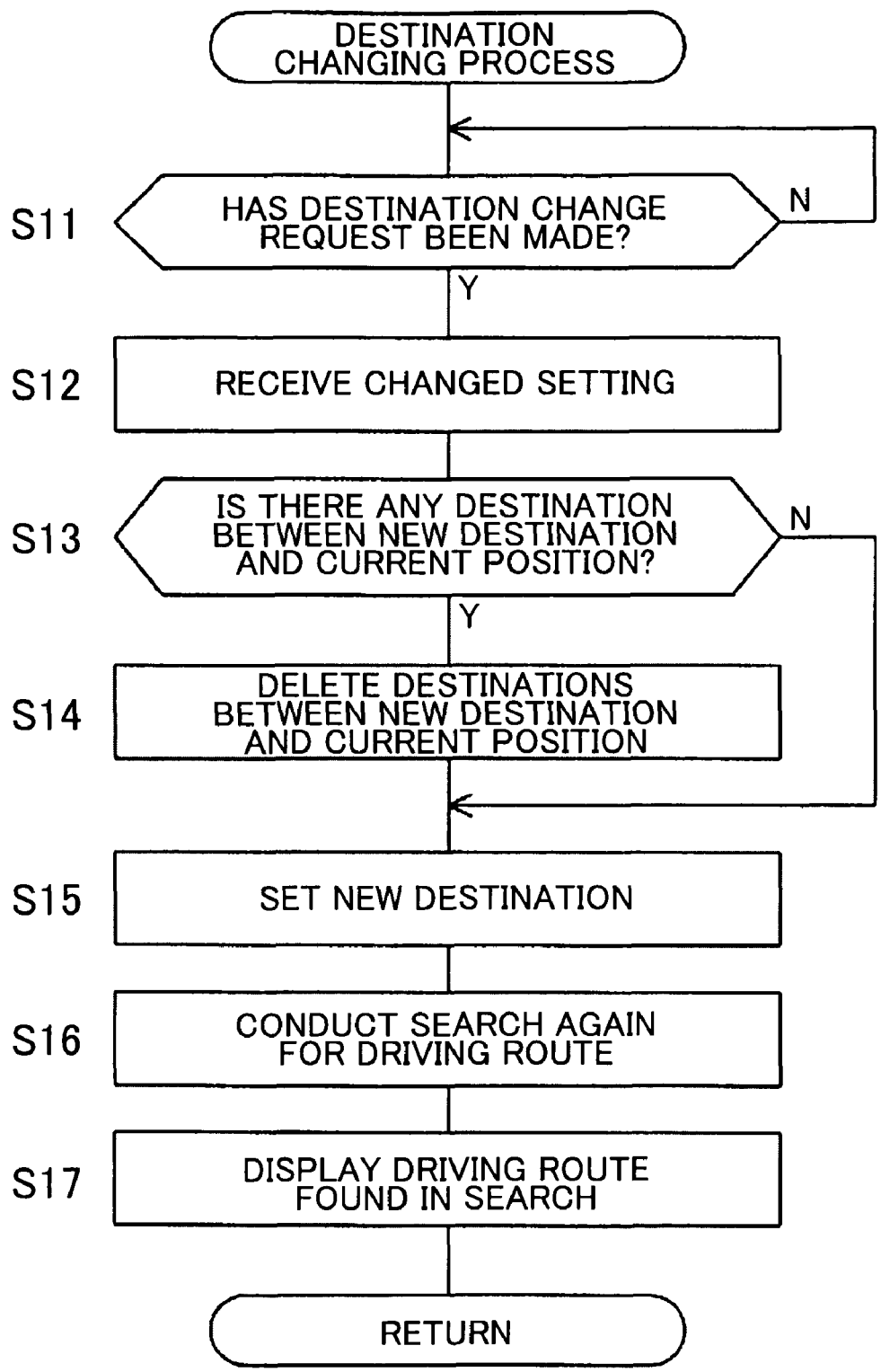
FIG. 2 is a flowchart that shows an exemplary destination changing method.

FIG. 2 is a flowchart that shows an exemplary destination changing method. The exemplary method may be implemented, for example, by one or more components of the above-described navigation apparatus 1. For example, the exemplary method may be implemented by the CPU 11 executing a computer program stored in the ROM 12 or the storage device 18. However, even though the exemplary structure of the above-described navigation apparatus 1 may be referenced in the description, it should be appreciated that the structure is exemplary and the exemplary method need not be limited by any of the above-described exemplary structure.

Figure 3A:
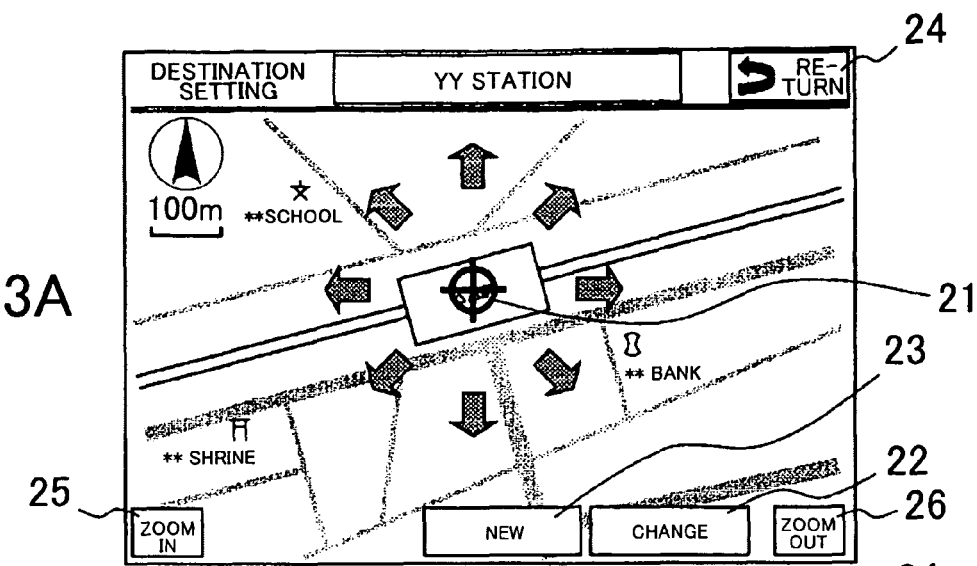
FIG. 3A and FIG. 3B are drawings of examples of screen displays for explaining the destination changing method.
Figure 3B:
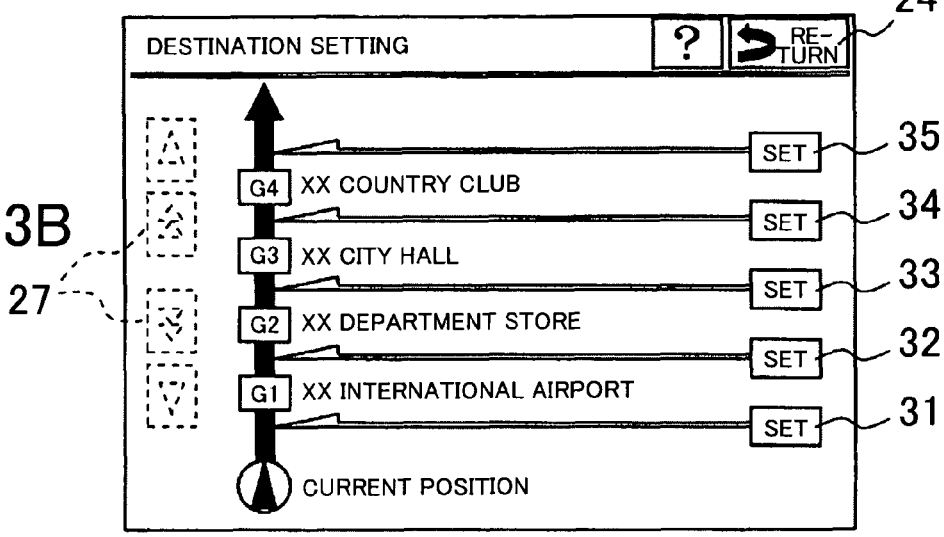

FIG. 3A and FIG. 3B are drawings of examples of screen displays for explaining the destination changing process.

When the user wishes to change one of the destinations on the driving route that is currently set, the user operates the touch panel in the navigation apparatus 1 and selects "DESTINATION SETTING" out of the items that are displayed on, for example, a main menu screen.

As a result, the CPU 11 runs the destination setting program 183 and displays, on the touch panel, selectable items showing methods for searching (i.e., designating) a destination that is to be newly set (hereinafter, a "new destination"). Examples of the search items for the new destination include, for example, a "name search" to narrow down the options by the alphabets used in the name of the new destination, a "genre search" to narrow down the options by the genre of the new destination, a "telephone number search" to narrow down the areas by the telephone number, and a "registered facility search" to conduct a search among the facilities that are registered in advance.

In the following sections, an example in which a "map search" has been selected as a search item for the new destination will be explained. The "map search" denotes a search in which the new destination is to be designated on a displayed map.

When the user has selected the item "map search" displayed on the touch panel, the CPU 11 displays a new destination setting screen as shown in FIG. 3A on the touch panel. As shown in FIG. 3A, on the new destination setting screen, a cursor 21, a change key 22, a new key 23, a return key 24, a zoom in key 25, and a zoom out key 26 are displayed, in addition to a map.

The cursor 21 is a pointer used for designating a location point or a facility on the map. In the present example, the cursor 21 has a function to designate a new destination. FIG. 3A shows a situation in which "YY Station" is designated by the cursor 21 as the new destination. The change key 22 is an operation key that receives a destination change request based on the new destination designated by the cursor 21.

The destination change request requests that the setting of one or more destinations arranged so as to be in ordinal positions that are earlier, in terms of the route order, than a designated ordinal position of the new destination should be deleted and a change should be made so that the new destination is arranged so as to be, eventually, in the first position in terms of the route order.

The new key 23 is an operation key that receives a destination new setting request, based on the new destination designated by the cursor 21. The destination new setting request requests that the entire setting of the destinations that are currently specified should be deleted (i.e., reset) and the designated new destination should be arranged in the first position in terms of the route order.

The return key 24 is an operation key that receives a request requesting that the display should go back to a previous screen. If the return key 24 is pushed in the present example, the display goes back to the screen on which the search item for the new destination can be selected.

The zoom in key 25 and the zoom out key 26 are operation keys that receive a request that the scale of the displayed map should be changed.

Returning to the description of the flowchart shown in FIG. 2, first, the CPU 11 of the navigation apparatus 11 determines whether the user has made a destination change request (step 11). The CPU 11 determines whether the user has made a destination change request based on an operation signal from the change key 22 shown in FIG. 3A.

When the user has not made a destination change request (step 11: No), in other words, when no operation signal from the change key 22 has been detected, the CPU 11 continues to monitor for a destination change request.

When the change key 22 has been pushed so that a destination change request is made (step 11: Yes) (more specifically, when the change key 22 has been pushed while "YY station" is being designated by the cursor 21 on the new destination setting screen shown in FIG. 3A), a screen on which an ordinal position of the new destination in terms of the route order (i.e., the order in which the vehicle is to be routed through the new destination) can be designated (hereinafter, the "new destination ordinal position designating screen"), as shown in FIG. 3B, will be displayed.

As shown in FIG. 3B, on the new destination ordinal position designating screen, the destinations that are currently set and the ordinal positions thereof, as well as set keys 31 to 35 that are used for designating the ordinal position of the new destination in terms of the route order are displayed.

When a large number of destinations have been set so that it is not possible to display all the destinations on one screen of the touch panel, scroll keys 27 are displayed so as to be active. In that situation, by operating the scroll keys 27, the user is able to cause one or more destinations that are not currently displayed on the screen to be displayed.

When the user wishes to designate the ordinal position of the new destination in terms of the route order so that the vehicle is to be routed through the new destination before "XX International Airport," which is currently in the first position in terms of the route order, the user is able to designate the ordinal position of the new destination by pushing the set key 31.

Similarly, when the user wishes to designate the ordinal position of the new destination in terms of the route order so that the vehicle is to be routed through the new destination before "XX Department Store," which is currently in the second position in terms of the route order, the user is able to designate the ordinal position of the new destination by pushing the set key 32. When the user wishes to designate the ordinal position of the new destination in terms of the route order so that the vehicle is to be routed through the new destination before "XX City Hall," which is currently in the third position in terms of the route order, the user is able to designate the ordinal position of the new destination by pushing the set key 33. When the user wishes to designate the ordinal position of the new destination in terms of the route order so that the vehicle is to be routed through the new destination before "XX Country Club," which is currently in the fourth position in terms of the route order, the user is able to designate the ordinal position of the new destination by pushing the set key 34. When the user wishes to designate the ordinal position of the new destination in terms of the route order so that the vehicle is to be routed through the new destination after "XX Country Club," which is currently in the fourth position in terms of the route order, the user is able to designate the ordinal position of the new destination by pushing the set key 35

The CPU 11 determines the designated ordinal position of the new destination based on an operation signal from one of the set keys 31 to 35, receives the information of the designated new destination and the information of the ordinal position of the new destination as changed setting information and stores the received changed setting information into the RAM 13 (step 12).

For example, when the ordinal position of the new destination has been designated so that the vehicle is to be routed through the new destination between the third destination and the fourth destination, the number "3.5," which indicates that the ordinal position of the new destination falls between the third position and the fourth position, is set as the designated ordinal position of the new destination. It should be noted, however, that the method for expressing the designated ordinal position of the new destination is not limited to this example. Alternatively, it is acceptable to use any other expression like "3-4" or "3-4," as long as it is possible to identify the designated position.

Further, it is acceptable to have another arrangement in which the information of the new destination is received and stored into the RAM 13, at a point in time when the change key 22 is pushed on the new destination setting screen shown in FIG. 3A.

When the designation of the ordinal position of the new destination has been received, the CPU 11 determines if there is any other destination that is currently set between the designated new destination and the current position of the vehicle (step 13).

When there are one or more destinations therebetween (step 13: Yes), the CPU 11 deletes the setting of all the destinations that are specified between the new destination and the current position of the vehicle (step 14).

For example, when the ordinal position of "YY Station" specified as the new destination has been designated so that the vehicle is to be routed through the new destination before "XX City Hall" as a result of the set key 33 being pushed, the CPU 11 deletes the setting of "XX International Airport" and "XX Department Store" that are specified between "XX City Hall" and the current position of the vehicle.

After that, the CPU 11 formally sets the designated new destination as one of the destinations through which the vehicle is to be routed on the driving route (step 15).

Figure 3C:
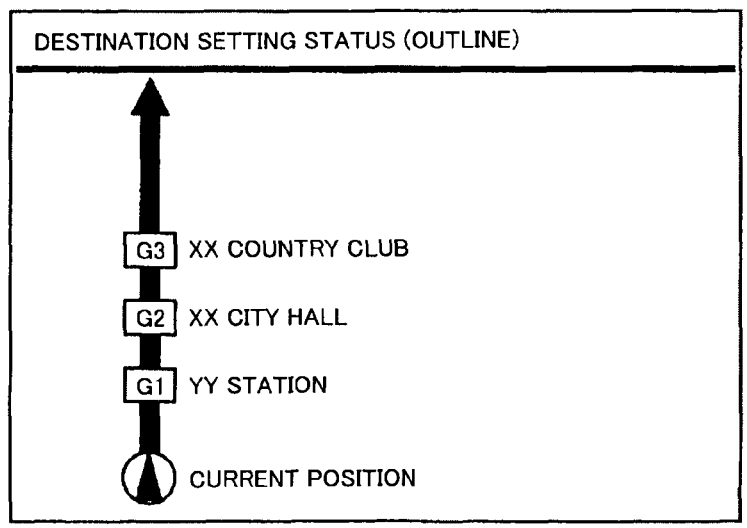
FIG. 3C is a drawing of an exemplary outline of a destination setting status after a new destination has formally been registered as one of the destinations.

FIG. 3C is a drawing of an outline of a destination setting status after the new destination has formally been registered as one of the destinations.

As shown in FIG. 3C, when the new destination "YY Station" has been designated so that the vehicle is to be routed through the new destination before "XX City Hall," the setting of "XX International Airport" and "XX Department Store" is deleted, so that the new destination "YY Station," instead, becomes the destination that is in the first position in terms of the route order. Accordingly, the ordinal positions of "XX City Hall" and "XX Country Club" that are later, in terms of the route order, than the ordinal position of the new destination "YY Station" are changed so that their respective ordinal numbers are decreased by one. As a result, the setting of the ordinal positions of the destinations has been re-specified.

When there is no destination between the designated new destination and the current position of the vehicle (step 13: No), in other words, when the ordinal position of the new destination in terms of the route order has been designated so that the vehicle is to be routed through the new destination before "XX International Airport," as a result of the set key 31 being pushed, the CPU 11 directly proceeds to the process at step 15.

When the set key 31 has been pushed, all the destinations that are currently set will remain. In other words, the set key 31 is used for simply adding the new destination before "XX International Airport," which is currently in the first position in terms of the route order.

As another example, when the set key 35 has been pushed on the new destination ordinal position designating screen as shown in FIG. 3B, so that the ordinal position of the new destination is designated so that the vehicle is to be routed through the new destination after "XX Country Club," the setting of all the destinations that are currently specified is deleted in the process at step 14. As a result, only the new destination remains as the destination after the change. For this reason, the set key 35 that is used for designating the ordinal position of the new destination so that the vehicle is to be routed through the new destination after the last destination has the same function as that of the new key 23 shown in FIG. 3A.

After the destination setting changing process has been performed, the CPU 11 runs the route search program 182 so that a search is conducted again for a driving route, based on the destination setting condition that has been changed (step 16). Specifically, the CPU 11 conducts the search for the routes in the one or more sections that are newly generated due to the changes made to the setting of the destinations and replaces the routes in the corresponding sections before the change is made to the destinations, with the results of the search.

For example, when the new destination "YY Station" has been designated so that the vehicle is to be routed through the new destination before "XX City Hall," and the destination setting condition has been changed from the one shown in FIG. 3B to the one shown in FIG. 3C, a search is conducted for a route in the section between the current position and "YY Station" and a route in the section between "YY Station" and "XX City Hall," these sections having newly been generated due to the change. The CPU 11 then replaces the routes suggested before the change is made, which are namely the route in the section between the current position and "XX International Airport" the route in the section between "XX International Airport" and "XX Department Store" and the route in the section between "XX Department Store" and "XX City Hall," with the routes that have been found in the search.

Further, there is a possibility that the time at which the vehicle is scheduled to arrive at "XX City Hall" before the change is made to the setting of the destinations may be different from the scheduled time of arrival after the change is made, because the driving route is changed.

For example, when a route search is conducted while the times at which the vehicle goes through certain location points are taken into consideration (e.g., predetermined roads are avoided during periods of time when they are expected to be congested), the optimal route for a certain section may vary depending on the time at which the vehicle is scheduled to go through the section.

Thus, when such a route searching method that takes temporal elements into consideration is used, when the time at which the vehicle is scheduled to arrive at "XX City Hall" is changed, there is a possibility that the optimal route corresponding to the section after "XX City Hall" (i.e., the section between "XX City Hall" and "XX Country Club") suggested before the change is made to the setting of the destinations may be different from the optimal route suggested after the change is made. In this case, it is possible to have an arrangement in which a route search is conducted again for the section between "XX City Hall" and "XX Country Club" so that the route suggested before the change is made is replaced with the route found in the search.

Subsequently, the CPU 11 displays, on the touch panel, the driving route that reflects the result of the route search obtained after the change is made to the setting of the destinations (step 17), and the method ends.

As explained above, according to the present example, the user is able to designate the new destination and to input the destination change request by, for example, pushing the change key 22. Also, by simply designating the ordinal position of the new destination in terms of the route order by pushing the set key 33, the user is able to make a change in the setting of the destinations so as to request that the new destination "YY Station" should be added between the destination "XX Department Store," which currently in the second position in terms of the route order, and the destination "XX City Hall," which is currently in the third position, and that "XX International Airport" and "XX Department Store" should be deleted.

In other words, the user is able to make such a change in the setting of the destinations by performing one step of operation, without having to perform the two steps of operations to add and to delete the destinations as in the related art.

Also, in the example according to the related art, when such a change is made to the setting of the destinations, the destination adding process and the destination deleting process are performed as two separate processes. Thus, a search is conducted again and again for a route in the corresponding section, every time a new route section is generated during each of the separated processes. As a result, as shown in FIGS. 6A to 6D, when the user wishes to make a change to the setting of the destinations while the vehicle is being driven toward the destination A so that the destination B' should be added between the destination B and the destination C, and also the destinations A and B should be deleted, the navigation apparatus according to the related art conducts, when the destination B' has been added, a search for a route in the section a, which is not reflected in the eventual result of the change made to the setting of the destinations.

According to the present example, however, the search is conducted for the driving route after both of the destination adding process and the destination deleting process have been finished. Thus, no route search is conducted for the section (i.e., the unnecessary section) that is not reflected in the eventual result of the change made to the setting of the destinations. Consequently, it is possible to reduce the load on the CPU 11 of the navigation apparatus 1.

In the example described above, the setting of all the destinations that are arranged so as to be between the new destination and the current position of the vehicle is deleted at step 14. After that, at step 15, the designated new destination is formally set as one of the destinations through which the vehicle is to be routed on the driving route.

However, the order in which the process to formally set the designated new destination as one of the destinations through which the vehicle is to be routed on the driving route is performed is not limited to this example. For example, another arrangement is possible in which this process is performed after the changed setting information is received at step 12, in other words, this process is performed before the setting of the destinations is deleted at step 14. In that situation, if there is no other destination between the designated new destination and the current position of the vehicle, the CPU 11 proceeds to perform the process to conduct a route search again at step 16.

Next, an example in which the navigation apparatus 1 has a function to simply add a new destination to the destinations that are currently specified in a setting will be explained.

Figure 4:
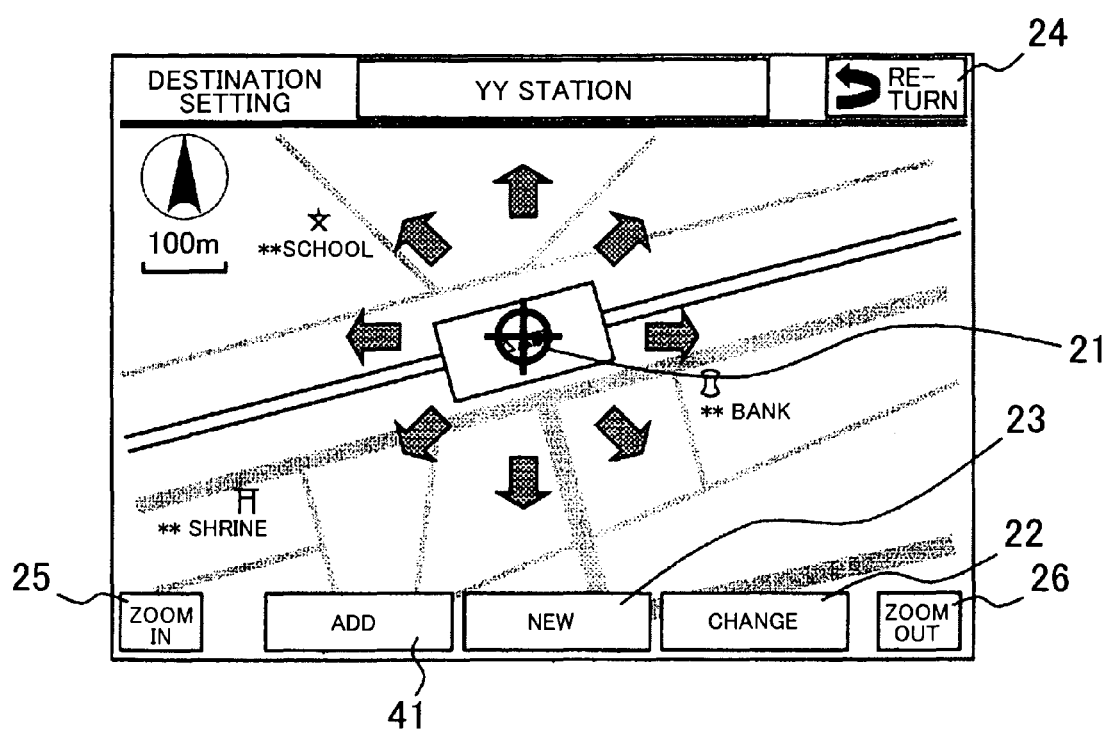
FIG. 4 is a drawing of an example of a new destination setting screen.

FIG. 4 is a drawing of an example of a new destination setting screen. The constituent elements having the same functions as those explained in the example described above will be referred to by using the same reference characters, and the detailed explanation thereof will be omitted so that only the modified portions will be explained.

As shown in FIG. 4, an add key 41 is provided on the new destination setting screen, in addition to the change key 22 and the new key 23. The add key 41 is an operation key that receives a destination addition request based on the new destination designated by the cursor 21. The destination addition request requests that the designated destination should be added to the other destinations that are currently set.

On the new destination setting screen as shown in FIG. 4, when the add key 41 has been pushed while "YY Station" is being designated by the cursor 21, the screen (i.e., the new destination ordinal position designating screen) on which an ordinal position of the new destination in terms of the route order (i.e., the order in which the vehicle is to be routed through the new destination) can be designated, as shown in FIG. 3B, will be displayed.

On the new destination ordinal position designating screen, when the user has pushed one of the set keys 31 to 35, the CPU 11 determines the designated ordinal position of the new destination based on an operation signal from the one of the set keys 31 to 35 and receives the information of the designated new destination and the information of the ordinal position of the new destination as additional setting information and stores the received additional setting information in the RAM 13.

It is possible to have another arrangement in which the information of the new destination is received and stored in the RAM 13 at a point in time when the add key 41 has been pushed on the new destination setting screen shown in FIG. 4.

The CPU 11 formally adds the designated new destination to the setting as one of the destinations through which the vehicle is routed on the driving route. After the new destination has been added to the setting, the CPU 11 runs the route searching program 182 and conducts a search again for a driving route.

Specifically, the CPU 11 conducts a search for a route in the section that is newly generated due to the addition of the new destination and replaces the route in the corresponding section suggested before the new destination is added, with the result of the search.

For example, when a new destination "YY Station" is added between "XX Department Store" and "XX City Hall," the CPU 11 conducts a search for a route in the section between "XX Department Store" and "YY Station" and a route in the section between "YY Station" and "XX City Hall," these sections having newly been generated due to the addition. The CPU 11 then replaces the route in the section between "XX Department Store" and "XX City Hall" suggested before the new destination is added, with the routes that have been found in the search.

Further, there is a possibility that the time at which the vehicle is scheduled to arrive at "XX City Hall" before the new destination is added may be different from the scheduled time of arrival after the new destination is added, because the driving route is changed.

In the same manner as explained in the example above, when such a route searching method that takes temporal elements into consideration is used, when the time at which the vehicle is scheduled to arrive at "XX City Hall" is changed, there is a possibility that the optimal route corresponding to the section after "XX City Hall" suggested before the new destination is added may be different from the optimal route that is suggested after the new destination is added. In this case, it is preferable to have an arrangement in which a route search is conducted again for the section between "XX City Hall" and "XX Country Club" so that the route suggested before the new destination is added is replaced with the route found in the search.

Subsequently, the CPU 11 then displays, on the touch panel, the driving route that reflects the result of the route search obtained after the new destination is added.

By providing the add key 41 on the new destination setting screen as explained above, it is possible to perform the process of simply adding the new destination to the existing setting of the destinations.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the examples described above, an arrangement is made so that, after having designated the new destination on the screen shown in FIG. 3A or FIG. 4, the user designates the ordinal position of the new destination in terms of the route order on the screen shown in FIG. 3B. However, the order in which the user performs the process to designate the new destination and the process to designate the ordinal position of the new destination is not limited to this example. It is possible to have another arrangement in which the user designates the ordinal position of the new destination first, and then designates the new destination second.

In such a situation, after the ordinal position of the new destination has been designated, the CPU 11 displays, on the touch panel, the selectable items showing the methods for designating the new destination and prompts the user to designate the new destination. After that, in the same manner as explained in the examples above, the CPU 11 displays the change key 22, the new key 23, and the add key 41 as buttons, on the new destination setting screen and prompts the user to make a selection regarding the various types of requests.

Further, in the examples described above, the change key 22, the new key 23, and the add key 41 are provided on the new destination setting screen so that the user is able to input his/her desired request by selectively operating one or more of these keys. However, the method used for inputting a destination change request, a destination addition request, or a new setting request is not limited to this example. For example, it is acceptable to have another arrangement in which, after the user has selected "DESTINATION SETTING" out of the items displayed on the main menu screen, a screen on which the user is able to make a selection out of these request items is displayed, so that the user is prompted to select his/her desired request item.

Alternatively, it is acceptable to have yet another arrangement in which, after the user has designated a new destination and the ordinal position of the new destination, a screen on which the user is able to make a selection out of these request items is displayed, so that the user is prompted to select his/her desired request item. When the screen on which the user is able to make a selection out of the request items is separately provided in this manner, a set key used for designating the new destination is provided on the new destination setting screen, instead of the keys used for designating the request items.

In the examples described above, the user is able to input a destination change request and a destination addition request on the new destination setting screen. However, the method for inputting these requests is not limited to this example.

Figure 5:
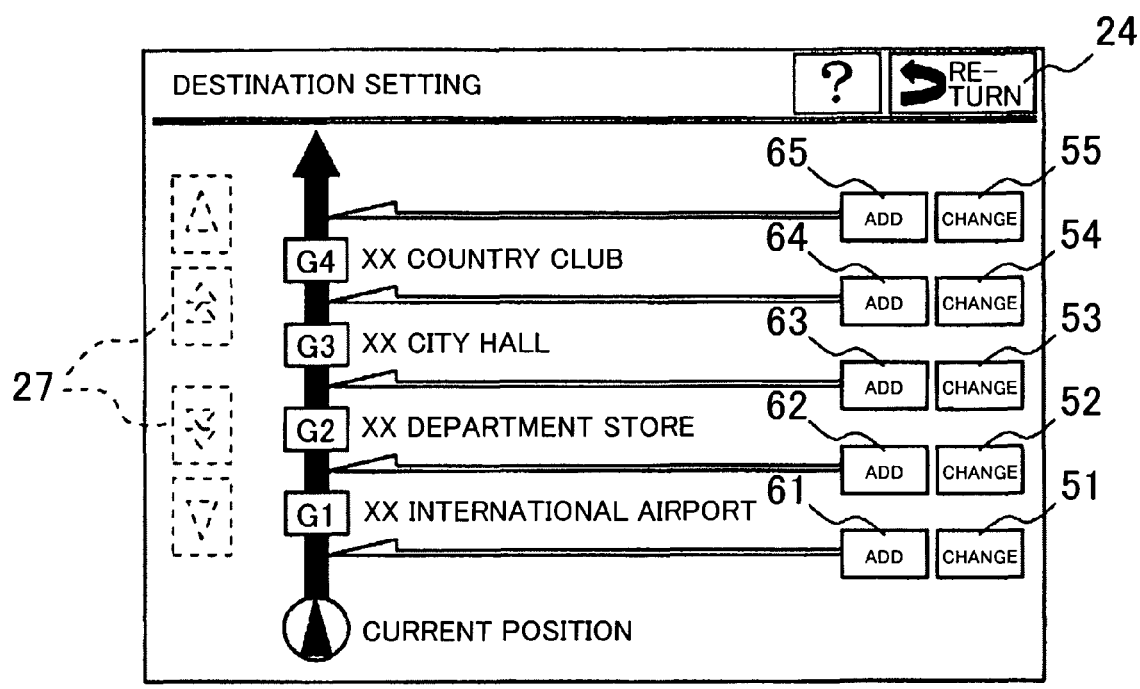
FIG. 5 is a drawing of an example of a new destination ordinal position designating screen.
Figure 6A:
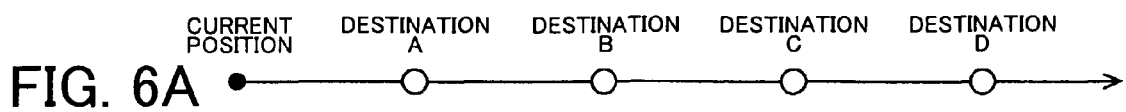
FIGS. 6A, 6B, 6C, and 6D are drawings for explaining related art.
Figure 6B:
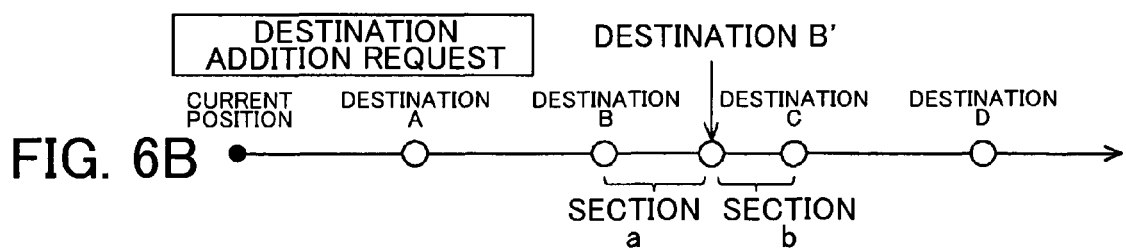
Figure 6C:
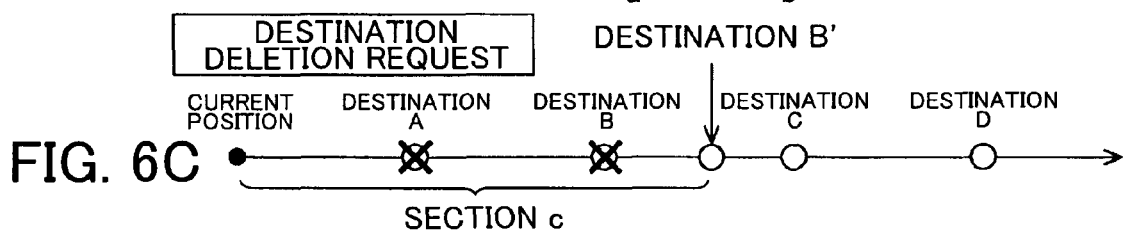
Figure 6D:
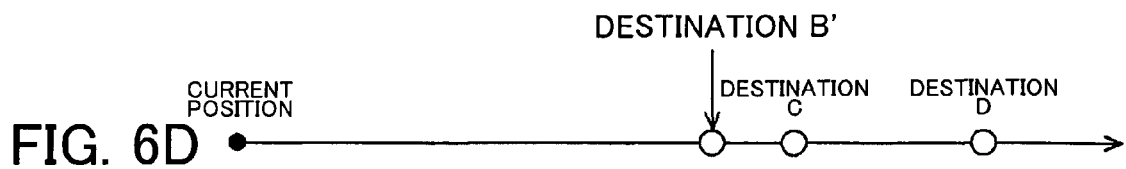

FIG. 5 is a drawing of an example of a new destination ordinal position designating screen. For example, on the new destination ordinal position designating screen, instead of the set keys 31 to 35, change keys 51 to 55 and add keys 61 to 65 are arranged as shown in FIG. 5. Accordingly, it is acceptable to have an arrangement in which the user is able to, at the same time, input a destination change request or a destination addition request and designate the ordinal position of the new destination in terms of the route order, by pushing one of the change keys 51 to 55 or one of the add keys 61 to 65 that are provided in the positions corresponding to the designated ordinal position of the new destination.

Also, in this situation, it is possible to have another arrangement in which the user designates the ordinal position of the new destination and inputs the destination change request or the destination addition request first, and then designates the new destination second.

It should be noted that, as shown in FIG. 5, the change keys 51 to 55 and the add keys 61 to 65 are provided so that the user is able to designate a predetermined position corresponding to each of the sections between every two destinations on the setting screen (i.e., before and after each of the destinations).

In the examples described above, on the new destination ordinal position designating screen as shown in FIG. 3B and FIG. 5, the current position and the plurality of destinations that are arranged in the route order are displayed. Further, the set keys 31 to 35 are displayed so as to be respectively provided in the position between the display of the current position and the display of the first destination and the positions between every two destinations (starting with the first destination and ending with the last destination), as well as the position after the last destination (in the example shown in FIG. 5, the change keys 51 to 55 and the add keys 61 to 65 are displayed).

By selecting one of the set keys 31 to 35 (or one of the change keys 51 to 55 and the add keys 61 to 65), the user is able to make a destination addition request or a destination change request for the new destination and also to designate the ordinal position of the new destination in terms of the route order. However, the method for designating the ordinal position of the new destination is not limited to this example. For example, it is possible to have another arrangement in which the user designates the ordinal position of the new destination by inputting a numeral. More specifically, it is acceptable to provide, on the screen, an ordinal position designating form having numeral input blank spaces into each of which a numeral can be input, such as "AFTER _____," "BEFORE _____," or "BETWEEN _____ AND _____." When, for example, the user wishes to designate the ordinal position of the new destination so that the vehicle is routed through the new destination between the second destination and the third destination, the user inputs numerals into the numeral input blank spaces in the ordinal position designating form so that it reads "AFTER 2," "BEFORE 3," or "BETWEEN 2 and 3."

The process to designate the ordinal position of the new destination so that the vehicle is routed through the new destination between the second destination and the third destination by inputting the numerals as described above corresponds to the process to designate the ordinal position by selecting the set key 33 provided between the second destination and the third destination in the above-described example shown in FIG. 3B (or by selecting the change key 53 or add key 63 in the modification example shown in FIG. 5).

What is claimed is:

1. A navigation apparatus that conducts a search for an original driving route that goes through a plurality of destinations in a designated order and provides route guidance based on the original driving route, the navigation apparatus comprising:
   a controller that is configured to:
      access the original driving route that goes through the plurality of destinations in the designated order;
      receive an input of a new destination;
      designate an ordinal position of the new destination in terms of the designated order;
      receive an input of a destination change request;
      when the destination change request is received, automatically delete one or more of the destinations in ordinal positions within the designated order that are before the ordinal position of the new destination;
      conduct a new search for a new driving route based on the new destination; and
      output the new driving route.

2. The navigation apparatus according to claim 1, wherein the controller is configured to conduct the search for the new driving route by searching for a first route section between a current position and the new destination and by searching for a second route section between the new destination and a next destination following the new destination within the designated order.

3. The navigation apparatus according to claim 2, wherein the controller is configured to create the new driving route by replacing a route section of the original driving route from the current position to the next destination with the first route section and the second route section.

4. The navigation apparatus according to claim 2, wherein the controller is configured to conduct the search for the new driving route by searching for a third route section from the next destination to a final destination.

5. The navigation apparatus according to claim 4, wherein the controller is configured to create the new driving route by replacing a route section of the original driving route between the next destination and the final destination with the third route section.

6. The navigation apparatus according to claim 1, wherein the controller is configured to:
   receive an input of an added destination request;
   when the added destination request is received, conduct a search for the new driving route including the new destination, without deleting destinations in ordinal positions within the designated order that are before the ordinal position of the new destination.

7. The navigation apparatus according to claim 6, wherein the controller is configured to:
   conduct the search for the new driving route by:
      searching for a first route section between a previous destination before the new destination in the designated order and the new destination; and
      searching for a second route section between the new destination and a next destination following the new destination within the designated order.

8. The navigation apparatus according to claim 6, further comprising a display with a touch screen, wherein the controller is configured to receive the input of the new destination as a result of a touching of the touch screen.

9. The navigation apparatus according to claim 8, wherein the controller is configured to:
   cause the display to display the plurality of destinations in the designated order;
   cause the display to display a plurality of buttons, one or more of the plurality of buttons being displayed in a position between each of the displayed plurality of destinations;
   receive an input indicating a selection of one of the plurality of buttons; and
   designate the ordinal position of the new destination based on the position of the selected button.

10. A navigation method implemented by a controller that conducts a search for an original driving route that goes through a plurality of destinations in a designated order and provides route guidance based on the original driving route, the method comprising:
   accessing the original driving route that goes through the plurality of destinations in the designated order;
   receiving an input of a new destination;
   designating an ordinal position of the received new destination in terms of the designated order;
   receiving an input of a destination change request;
   when the destination change request is received, automatically deleting one or more of the destinations in ordinal positions within the designated order that are before the ordinal position of the new destination;
   conducting a new search for a new driving route based on the new destination; and
   outputting the new driving route.

11. The navigation method according to claim 10, wherein conducting the search for the new driving route comprises:
   searching for a first route section between a current position and the new destination; and
   searching for a second route section between the new destination and a next destination following the new destination within the designated order.

12. The navigation method according to claim 11, further comprising creating the new driving route by replacing a route section of the original driving route from the current position to the next destination with the first route section and the second route section.

13. The navigation method according to claim 11, wherein conducting the search for the new driving route comprises searching for a third route section from the next destination to a final destination.

14. The navigation method according to claim 13, further comprising creating the new driving route by replacing a route section of the original driving route between the next destination and the final destination with the third route section.

15. The navigation method according to claim 10, further comprising:
   receiving an input of an added destination request;
   when the added destination request is received, conducting a search for the new driving route including the new destination, without deleting destinations in ordinal positions within the designated order that are before the ordinal position of the new destination.

16. The navigation method according to claim 15, wherein conducting the search for the new driving route comprises:

searching for a first route section between a previous destination before the new destination in the designated order and the new destination; and searching for a second route section between the new destination and a next destination following the new destination within the designated order.

17. The navigation method according to claim 15, further comprising:

receiving the input of the new destination as a result of a touching of a touch screen.

18. The navigation method according to claim 16, further comprising:

displaying the plurality of destinations in the designated order;

displaying a plurality of buttons, one or more of the plurality of buttons being displayed in a position between each of the displayed plurality of destinations;

receiving an input indicating a selection of one of the plurality of buttons; and designating the ordinal position of the new destination based on the position of the selected button.

19. A computer-readable storage medium storing a computer-executable program usable to control a controller that conducts a search for an original driving route that goes through a plurality of destinations in a designated order and provides route guidance based on the original driving route, the program comprising:

instructions for accessing the original driving route that goes through the plurality of destinations in the designated order;

instructions for receiving an input of a new destination;

instructions for designating an ordinal position of the received new destination in terms of the designated order;

instructions for receiving an input of a destination change request;

instructions for, when the destination change request is received, automatically deleting one or more of the destinations in ordinal positions within the designated order that are before the ordinal position of the new destination;

instructions for conducting a new search for a new driving route based on the new destination; and instructions for outputting the new driving route.

20. The computer-readable storage medium according to claim 19, wherein the program further comprises:

instructions for receiving an input of an added destination request;

instructions for, when the added destination request is received, conducting a search for the new driving route including the new destination, without deleting destinations in ordinal positions within the designated order that are before the ordinal position of the new destination.

* * * * *